United States Patent [19]
Frey et al.

[11] Patent Number: 5,594,753
[45] Date of Patent: Jan. 14, 1997

[54] CARTRIDGE EXCIMER LASER SYSTEM

[75] Inventors: Rudolph W. Frey; Philip D. Bolen, both of Orlando, Fla.

[73] Assignee: Autonomous Technology Corporation, Orlando, Fla.

[21] Appl. No.: 232,754

[22] Filed: Apr. 25, 1994

[51] Int. Cl.$^6$ .............................. H01S 3/22; H01S 3/223
[52] U.S. Cl. ................................ 372/57; 372/86
[58] Field of Search ........................... 372/57, 86

[56] References Cited

U.S. PATENT DOCUMENTS

| | | | |
|---|---|---|---|
| 4,088,965 | 5/1978 | Lauderslager et al. | 372/57 |
| 4,817,096 | 3/1989 | Nighan et al. | 372/57 |
| 4,829,536 | 5/1989 | Kajiyama et al. | 372/57 |
| 4,958,356 | 9/1990 | Tanuma | 372/57 |
| 5,087,388 | 2/1992 | Mahoney et al. | 372/53 |
| 5,181,217 | 1/1993 | Sato et al. | 372/86 |
| 5,260,961 | 11/1993 | Zhou et al. | 372/57 |

*Primary Examiner*—Rodney B. Bovernick
*Assistant Examiner*—Robert E. Wise

[57] ABSTRACT

A new cartridge excimer laser system and method for generating an excimer laser beam using the system are provided. The system utilizes a cartridge (10) which contains a halogen-noble gas mixture (19), electrodes (50, 60) having external electrical connections (30, 40), an assembly (20) for transmitting a laser beam output (400), and an external gas port (90). The cartridge (10) fits onto a receptacle (100) located within a receiving compartment (200) of the laser base (300) of the new system. The cartridge (10) is easily replaced by the system operator and is refurbished by the manufacturer when the gas mixture (19) therein is exhausted.

16 Claims, 4 Drawing Sheets

CARTRIDGE EXCIMER LASER SYSTEM

BACKGROUND OF THE INVENTION

1. Field of the Invention

The invention relates to the field of excimer lasers and more particularly to an argon-fluorine cartridge excimer laser system.

2. Description of the Related Art

Excimer lasers are a family of lasers in which light is emitted by a short-lived noble gas-halide molecule, composed of one noble gas atom, such as argon, krypton or xenon, and one halogen atom, such as fluorine, chlorine or bromine. These lasers are the most powerful practical ultraviolet lasers and have applications in the medical field and in high technology industrial systems.

Existing excimer laser systems have a number of drawbacks which are directly related to the halogens employed to generate the laser beam. Since halogens are the most chemically reactive elements, this component of the gas mixture tends to combine with other chemicals present in the system, i.e. the container, seal and valve materials. The halogen component is eventually depleted over time. As a result, the laser reservoir must be evacuated and refilled with the proper gas mixture on a regular basis. This potentially hazardous, technically demanding, and labor intensive procedure increases the operating and maintenance costs as well as the downtime of existing systems.

In addition, current excimer laser systems typically require a large amount of auxiliary equipment due to the hazardous nature of the halogen gas present. The auxiliary equipment required includes gas cylinders, regulator systems, pressure delivery systems with connecting hoses, vacuum pumps, scrubber systems, and numerous filters, valves and tubes. This equipment occupies a large amount of physical space, usually filling a whole room. Therefore, the operator must be trained to handle not only the hazardous halogen gas, but all of the auxiliary equipment as well. The technical training required for operation of the auxiliary equipment contributes to the cost of existing excimer laser systems.

SUMMARY OF THE INVENTION

Accordingly, it is an object of the present invention to provide an excimer laser system utilizing a gas-containing cartridge.

It is another object of the present invention to provide an excimer laser system utilizing a gas-containing cartridge which is less expensive to operate and maintain than existing systems.

It is a further object of the present invention to provide an excimer laser system utilizing a gas-containing cartridge which is safer to operate and maintain than existing systems.

It is yet another object of the present invention to provide an excimer laser system utilizing a gas-containing cartridge which requires low field maintenance.

It is yet a further object of the present invention to provide a gas-containing cartridge for use in excimer laser systems which eliminates the necessity of regeneration of the halogen-noble gas mixture on-site.

Another object of the present invention is to provide a gas-containing cartridge for use in excimer laser systems which eliminates the extensive auxiliary equipment required to operate and maintain an excimer laser system, thereby occupying less physical space.

A further object of the present invention is to provide a gas-containing cartridge which is compact in size and contains a smaller amount of hazardous halogen gas than the reservoirs of existing systems.

A still further object of the present invention is to provide a gas-containing cartridge for use in excimer laser systems which is constructed of inert materials which extend the lifetime of the halogen-noble gas mixture therein.

A final object of the present invention is to provide a method for generating an excimer laser beam which is safer, simpler and less labor intensive, and requires less extensive technical training for the operator than current methods.

The invention is an excimer laser system which utilizes a gas-containing cartridge. The operator places a fresh cartridge into a receiving compartment of the laser base, activates the system, and uses the laser beam output in a desired application. When the halogen component of the gas mixture is depleted, the operator removes the spent cartridge and replaces it with a fresh cartridge. The operator sends the spent cartridge to the manufacturer for refurbishing. This is a safer and more cost-effective approach than on-site regeneration of the hazardous gas mixture. Since the cartridge can be exchanged within a reasonably short period of time, this feature reduces downtime. By reducing costs and downtime, the cartridge feature makes the present invention more economical than existing excimer laser systems.

The invention, with its gas-containing cartridge, occupies substantially less physical space and reduces the operator's risk of exposure to hazardous halogen gas. The cartridge, which is approximately eight and one-half inches long and approximately four inches in diameter, fits within a receiving compartment in the base portion of the excimer laser system. The amount of hazardous fluorine in the cartridge is, if leaked, well below the short-term exposure limit. In fact, the cartridges may be safely transported by ordinary shipping carriers. Thus, the cartridge feature also makes the present invention safer to operate and maintain than existing excimer laser systems.

BRIEF DESCRIPTION OF THE DRAWINGS

The above and numerous other objects of the invention that may be achieved by the method and preferred embodiment of the invention will be more readily understood from the following detailed description and the appended drawings wherein.

DETAILED DESCRIPTION OF THE INVENTION

The first portion of the following description will focus on the structure of the cartridge excimer laser system. The second portion of the description will focus on a method of generating an excimer laser beam with the cartridge system.

Figure 1:
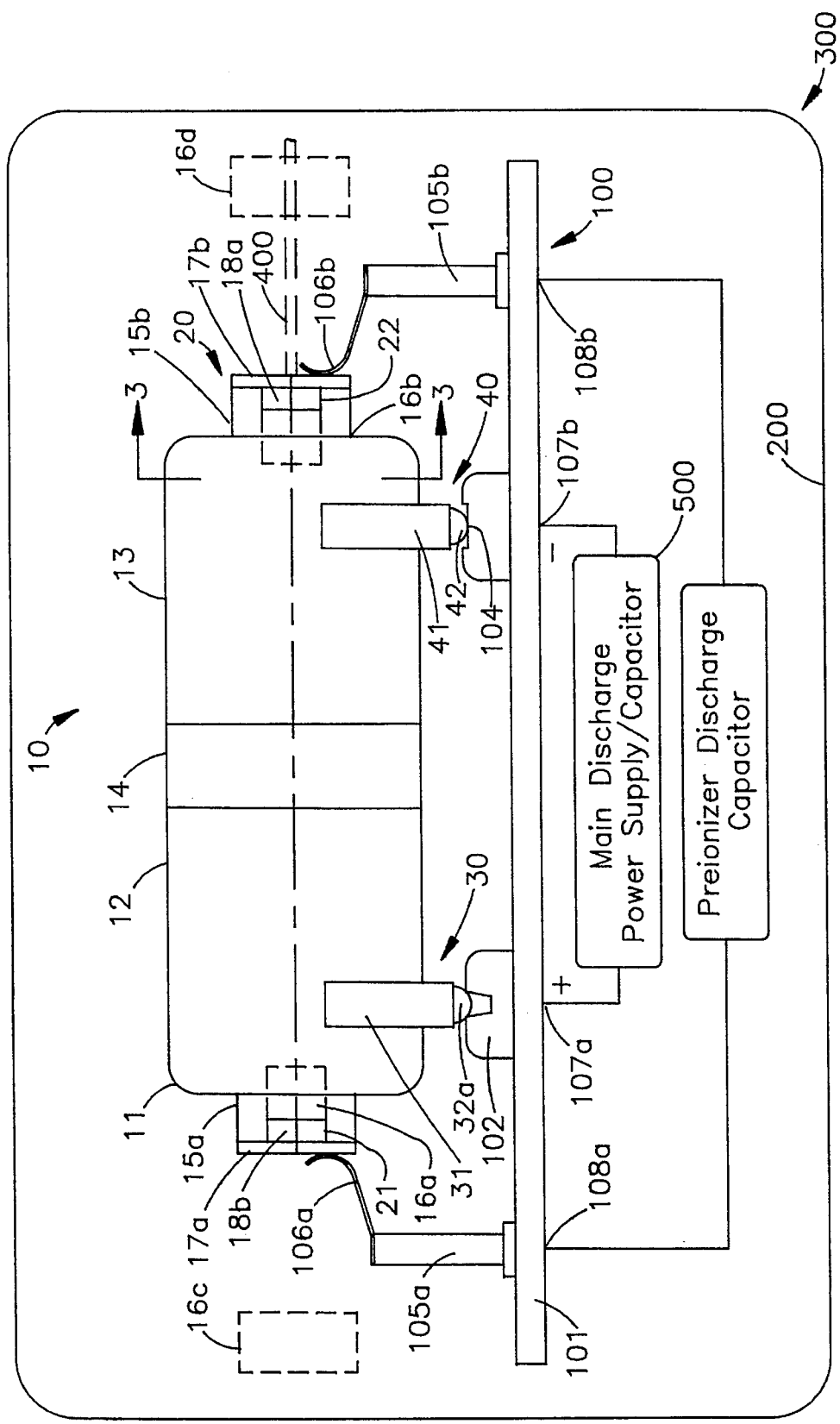
FIG. 1 is a side view of an excimer laser cartridge positioned upon the receptacle within the receiving compartment of the laser base.

Description of the Invention—FIG. 1

Reference is now made to the drawings in detail, wherein like characters indicate like parts throughout the several figures. In FIG. 1, a side view of an excimer laser cartridge positioned upon the receptacle within the receiving compartment of the laser base, the reference numeral 10 refers generally to an excimer laser cartridge which is positioned upon a receptacle 100 within a receiving compartment 200 of a laser base 300 of an excimer laser system.

Excimer laser cartridge 10 comprises a container 11, an assembly 20 for transmitting a laser beam output 400, and two external electrical connections 30, 40. Container 11 contains a gas mixture 19 comprised of a noble gas and a halogen, which is employed in generating excimer laser beam output 400. A gas port 90, located on an exterior portion of container 11, is used to fill and evacuate container 11. Container 11 comprises a laser output end portion 13 and a rear end portion 12 which are separated and sealed by an annular band or seal 14. End portions 12, 13 are made of conductive material, preferably aircraft aluminum coated with a halogen-resistant synergistic material such as Magnaplate™ coating, manufactured by General Magnaplate of Linden, N.J. Band 14, made of a non-conductive material, preferably a ceramic such as aluminum oxide, electrically insulates and prevents arcing between conductive end portions 12, 13. O-ring assemblies (not shown) on band 14 seal end portions 12, 13 to band 14.

Container 11 has, at each end, an off-center assembly 20 for transmitting laser beam output 400. In embodiments having an internal mirror system, mounts 15a, 15b, made of a non-conductive material, preferably a ceramic such as aluminum oxide, hold mirrors 16a, 16b. In alternative embodiments having an external mirror system, mirrors 16c, 16d are positioned outside cartridge 10. Retainers 17a, 17b, located at the outer ends of mounts 15a, 15b, hold windows 21, 22 for transmitting laser beam output 400. Window 21 is totally reflective and window 22 is partially transmissive; both windows are made of magnesium fluoride or calcium fluoride. Electrical feeds 18a, 18b connect retainers 17a, 17b to the preionizing electrodes (not shown) located within container 11. Retainers 17a, 17b have a dual purpose: they function as external electrical connections for the preionizing electrodes (not shown) within container 11 in addition to holding windows 21, 22.

Container 11 has two external electrical connections, referred to generally by the reference numerals 30, 40, for the main discharge electrodes (not shown) located therein. External electrical connections 30, 40 are U-shaped bands 31, 41 carrying one or two precision ball bearings 32a, 42 (two of three are shown) which fit into machined depressions 102, 104 (two of three are shown) located within raised bases 109a, 109b of receptacle 100. U-shaped bands 31, 41 are made of a conductive material such as aluminum and ball bearings 32a, 42 are made of a conductive material such as stainless steel. The three-ball arrangement of external electrical connections 30, 40 aids proper alignment of cartridge 10 with receptacle 100 of receiving compartment 200 of laser base 300. Contact between ball bearings 32a, 42 (two of three are shown) and machined depressions 102, 104 (two of three are shown) completes an electrical circuit between the main discharge electrodes (not shown) located within container 11 of cartridge 10 and a power supply 500. Contact occurs when cartridge 10 is positioned properly upon receptacle 100. Power supply 500, located within laser base 300, provides an electric charge for both the main discharge electrodes (not shown) and the preionizing electrodes (not shown) located within container 11 of cartridge 10.

Still referring to FIG. 1, receptacle 100 comprises a dielectric plate 101, machined depressions 102, 104 (two of three are shown) within raised bases 109a, 109b, electrical connectors 105a, 105b, and spring clips 106a, 106b. Plate 101 is made of a non-conductive material such as Delrin™ manufactured by DuPont Company of Wilmington, Del. On one side of plate 101 are electrical connectors 105a, 105b, spring clips 106a, 106b, and machined depressions 102, 104 (two of three are shown) within raised bases 109a, 109b . Electrical connectors 105a, 105b, made of a conductive material such as aluminum, anchor spring clips 106a, 106b to plate 101. Spring clips 106a, 106b , made of a conductive material such as gold-plated copper, form part of an electrical circuit between the preionizing electrodes (not shown) located within container 11 of cartridge 10 and power supply 500. Contact between spring clips 106a, 106b and retainers 17a, 17b completes the electrical circuit. Contact occurs when cartridge 10 is positioned properly upon receptacle 100. Electrical feeds 107a, 107b, 108a, 108b, made of a conductive material such as copper, pass through openings 110a, 110b, 110c, 110d located within plate 101. Feeds 108a, 108b, which pass through openings 110a, 110d and attach to electrical connectors 105a, 105b, respectively, form part of the electrical circuit between the preionizing electrodes (not shown) and power supply 500. Feeds 107a, 107b, which pass through openings 110b, 110c and attach to raised bases 109a, 109b, respectively, form part of the electrical circuit between the main discharge electrodes (not shown) and power supply 500. As discussed above, contact between ball bearings 32a, 42 (two of three are shown) of container 11 and machined depressions 102, 104 (two of three are shown) of receptacle 100 completes the latter electrical circuit. Contact occurs when cartridge 10 is positioned properly upon receptacle 100.

Description of the Invention—FIGS. 2–9

Figure 2:
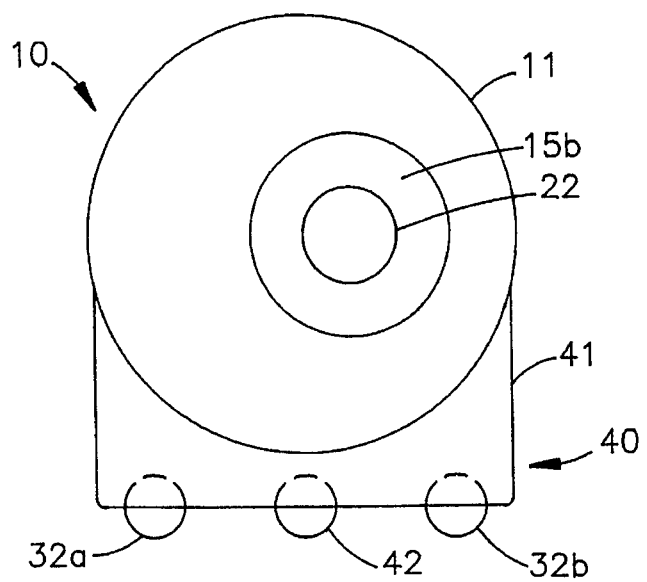
FIG. 2 is an external view of the laser output end portion of an excimer laser cartridge.

FIG. 2, an external view of the laser output end portion of an excimer laser cartridge, shows off-center mount 15b, transmissive window 22, external electrical connection 40, and ball bearings 32a, 32b, 42. External electrical connection 40 for the main discharge electrodes (not shown) located within container 11 is a U-shaped band 41 carrying a single precision ball bearing 42. U-shaped band 41 is made of a conductive material such as aluminum and ball bearing 42 is made of a conductive material such as stainless steel. The U-shaped band of the external electrical connection (not shown) located on the rear end portion (not shown) of container 11 carries two ball bearings 32a, 32b made of a conductive material such as stainless steel. The three-ball arrangement of the two external electrical connections aids proper alignment of laser cartridge 10 with receptacle 100 of receiving compartment 200 of laser base 300.

Figure 3:
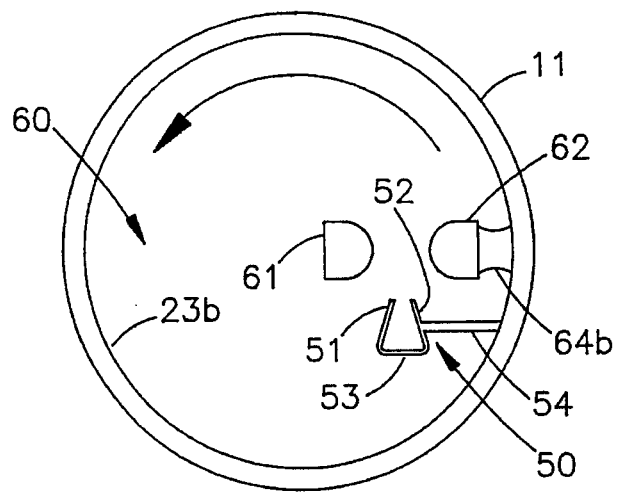
FIG. 3 is a transverse cross section of an excimer laser cartridge showing the arrangement of the electrodes therein.

FIG. 3, a transverse cross section of the laser output end portion of an excimer laser cartridge, shows the spatial arrangement of the preionizing electrodes and the main discharge electrodes located therein. The reference numeral 50 refers generally to the two preionizing electrodes and the reference numeral 60 refers generally to the two main discharge electrodes. Preionizing electrodes 50 and main discharge electrodes 60 are positioned on one side of container 11, which results in convection cooling therein. Preionizing electrodes 50 comprise a pair of plates 51, 52 extending from a base 53 at an acute angle toward each other to form an open triangular configuration. Plates 51, 52 are made of a conductive material such as stainless steel, and base 53 is made of a non-conductive ceramic such as aluminum oxide. Preionizing electrode support 54, made of a non-conductive ceramic such as aluminum oxide, attaches to inner wall 23b of laser output end portion 13 of container 11. Main discharge electrodes 60 comprise a pair of parallel bars or rods 61, 62 which are made of a conductive material such as nickel. Main discharge electrode support 64b for bar 62 attaches to inner wall 23b of laser output end portion 13 of container 11. The electrode supports (not shown) for bar 61 attach to the inner wall of the rear end portion (not shown) of container 11. Electrode support 64b is made of a conductive material such as aluminum.

Figure 4:
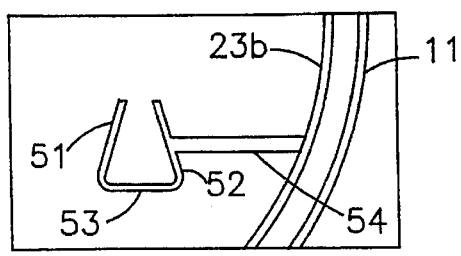
FIG. 4 is a detailed cross-sectional view of the preionizing electrode configuration within an excimer laser cartridge.

FIG. 4, a detailed view of the preionizing electrode arrangement shown in FIG. 3, shows preionizing electrodes 50 which comprise a pair of plates 51, 52 extending from a base 53 at an acute angle toward each other to form an open triangular configuration. Plates 51, 52 are made of a conductive material such as stainless steel, and base 53 is made of a non-conductive material such as ceramic.

Figure 5:
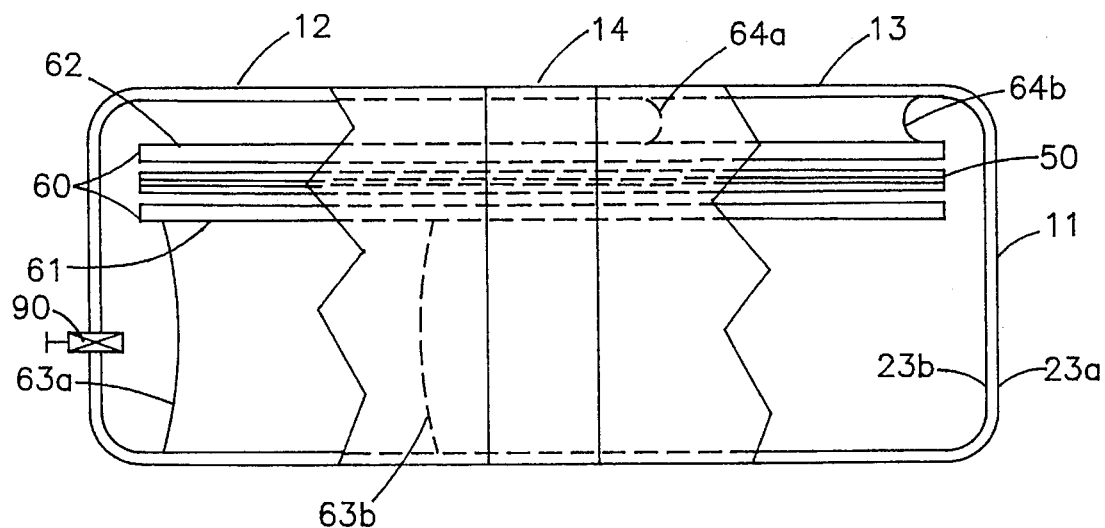
FIG. 5 is an overhead view of an excimer laser cartridge.

FIG. 5, an overhead view of an excimer laser cartridge, shows the spatial arrangement of the preionizing electrodes, main discharge electrodes and electrode supports within the laser cartridge container. Preionizing electrodes 50 and main discharge electrodes 60 are located on one side of container 11. Main discharge electrodes 60 comprise a pair of parallel bars or rods 61, 62 made of a conductive material such as nickel. Electrode supports 64a, 64b for bar 62 attach to inner wall 23b of laser output end portion 13 of container 11. Electrode supports 63a, 63b for bar 61 attach to inner wall 23a of rear end portion 12 of container 11. Electrode supports 63a, 63b, 64a, 64b, made of a conductive material such as copper, and conductive end portions 12, 13 of container 11 form part of an electrical circuit between main discharge electrodes 60 and the power supply (not shown). Non-conductive annular band 14 seals and prevents arcing between conductive end portions 12, 13 of container 11.

Figure 6:
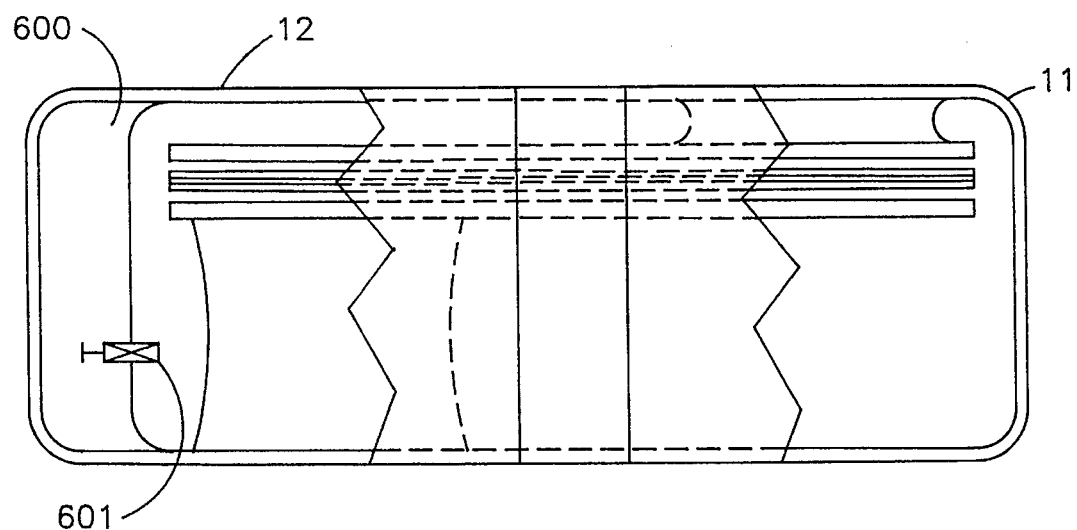
FIG. 6 is an overhead view of an alternative embodiment of an excimer laser cartridge.

FIG. 6, an overhead view of an alternative embodiment of an excimer laser cartridge, shows an attached mini-tank for the halogen gas. Mini-tank 600 is a sealed container adjoining rear end portion 12 of container 11 of cartridge 10. Mini-tank 600 is a reservoir for the halogen gas added to restore the proper gas mixture 19 within container 11 after depletion of the halogen component. Magnetic fill valve 601 controls entry of the halogen gas from mini-tank 600 into container 11.

Figure 7:
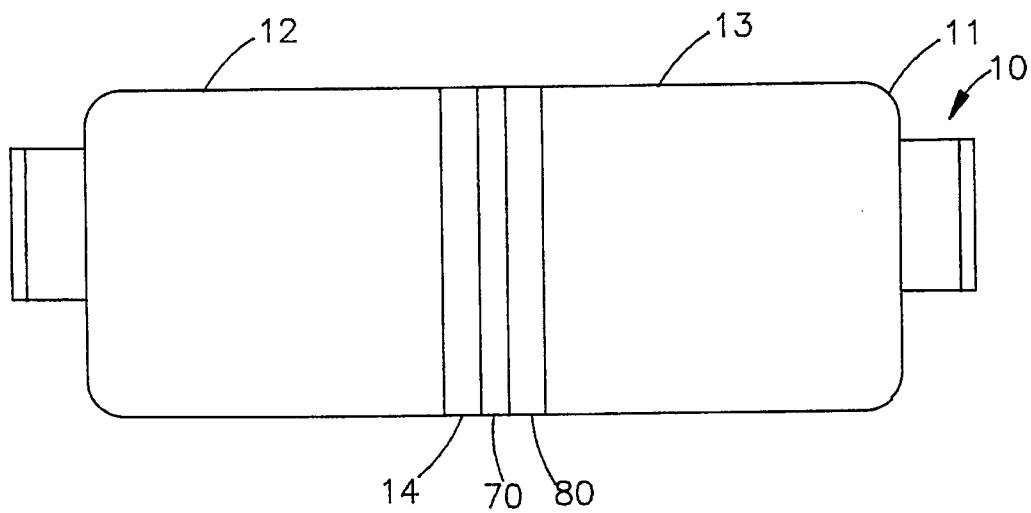
FIG. 7 is a side view of an alternative embodiment of an excimer laser cartridge.

FIG. 7, a side view of an alternative embodiment of an excimer laser cartridge, shows an external annular electrode and an additional annular insulating seal. External annular electrode 70 is positioned between two annular insulating bands or seals 14, 80 of container 11 of cartridge 10. Electrode 70 functions as the external electrical connection for the preionizing electrodes (not shown) in this embodiment of cartridge 10, replacing retainers 17a, 17b in this respect. Bands 14, 80 electrically insulate external electrode 70 from conductive end portions 12, 13. O-ring assemblies (not shown) on bands 14, 80 seal container 11.

Figure 8:
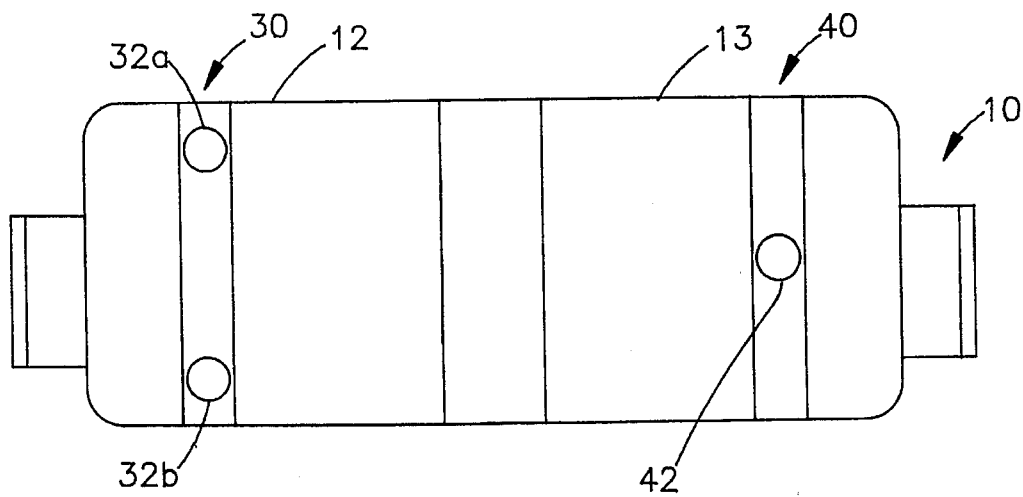
FIG. 8 is a bottom view of an excimer laser cartridge.

FIG. 8, a bottom view of an excimer laser cartridge, shows the three-ball arrangement of the external electrical connections for the main discharge electrodes (not shown) located within the laser cartridge container. The three-ball arrangement aids the proper alignment of cartridge 10 with the receptacle (not shown) located within the laser base compartment (not shown). External electrical connection 30 of rear end portion 12 of container 11 carries two precision ball bearings 32a, 32b which fit into machined depressions (not shown) of the receptacle (not shown). External electrical connection 40 of laser output end portion 13 of container 11 carries a single precision ball bearing 42 which fits into a machined depression (not shown) of the receptacle (not shown). Contact between ball bearings 32a, 32b, 42 and the three machined depressions of the receptacle (not shown) completes an electrical circuit between the main discharge electrodes (not shown) located within container 11 and the power supply (not shown). Contact occurs when cartridge 10 is properly positioned upon the receptacle (not shown).

Figure 9:
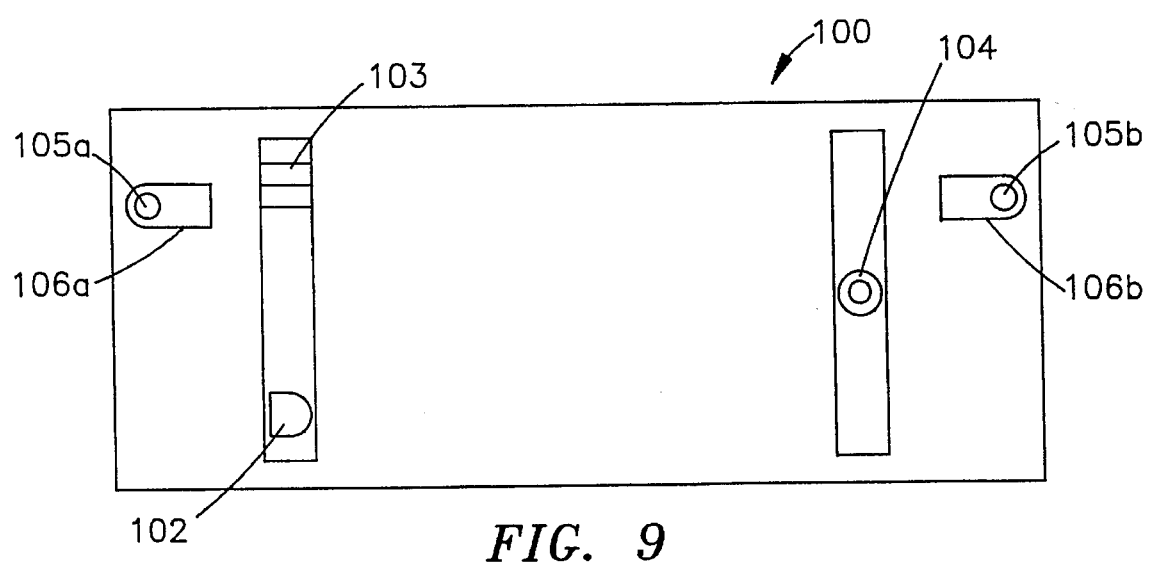
FIG. 9 is an overhead view of the receptacle within the receiving compartment of the laser base.

FIG. 9, an overhead view of a receptacle, shows the arrangement of the three machined depressions for receiving the three ball bearings of the external electrical connections of a laser cartridge (not shown) and the spring clips. Receptacle 100 comprises dielectric plate 101, electrical connectors 105a, 105b, spring clips 106a, 106b, raised bases 109a, 109b and three machined depressions 102, 103, 104 therein for receiving the three ball bearings of the external electrical connections of a laser cartridge (not shown). Machined depressions 102, 103, 104 aid alignment of a laser cartridge (not shown) with receptacle 100. The depressions allow differing degrees of freedom of movement for the ball bearings during positioning of a cartridge (not shown) upon receptacle 100. Machined flat 102 allows complete freedom of movement in all directions, machined valley 103 allows only transverse movement, and tapered hole 104 allows only pivotal movement. Contact between the ball bearings (not shown) and machined depressions 102, 103, 104 completes an electrical circuit between the main discharge electrodes (not shown) of a laser cartridge (not shown) and the power supply (not shown). Contact occurs when a laser cartridge (not shown) is properly positioned upon receptacle 100. Spring clips 106a, 106b extend inward from electrical connectors 105a, 105b to form part of an electrical circuit between the preionizing electrodes (not shown) within a laser cartridge (not shown) and the power supply (not shown). Contact occurs when a laser cartridge (not shown) is properly positioned upon receptacle 100.

Operation and Method of the Invention

The following discussion will illustrate the operation of a cartridge excimer laser system and a method for generating an excimer laser beam using the system. A fresh gas-containing excimer laser cartridge 10 is placed upon receptacle 100 within receiving compartment 200 of laser base 300, in a manner such that ball bearings 32a, 32b, 42 of external electrical connections 30, 40 of cartridge 10 are properly aligned with machined depressions 102, 103, 104 of receptacle 100. The alignment of the optical axis of cartridge 10 is checked using a helium neon laser. The interlock system of laser base 300 is used to verify that the electrical connections of cartridge 10 and receptacle 100 are in contact and that cartridge 10 is enabling power supply 500 to charge.

Once the optical alignment and electrical connection checks are made, the steps required for generation of an excimer laser beam 400 are executed. An electric charge of approximately 11,000 volts, generated by power supply 500, is applied to preionizing electrodes 50. A continuous corona discharge across preionizing electrodes 50 ionizes the neon gas present within container 11, resulting in a high density of ultraviolet light across the discharge area. This process insures that a uniform discharge across main discharge electrodes 60 will occur during the next pulse from power supply 500. A second 10,000 volt charge is applied to main discharge electrodes 60. The discharge across main discharge electrodes 60 ionizes the noble gas and halogen molecules, forming short-lived noble gas-halide molecules, which emit ultraviolet (UV) light. The UV light is amplified by mirrors 16a, 16b (internal mirror system) or mirrors 16c, 16d (external mirror system) and emerges from laser cartridge 10 as excimer laser beam output 400. Excimer laser beam output 400 is utilized in a particular application desired by the system operator. Once gas mixture 19 within cartridge 10 has exhausted its fluorine content, the operator replaces the old cartridge with a new one, and returns the old cartridge to the manufacturer for refurbishing.

The advantages of the cartridge excimer laser system are numerous. First, the initial, operating and maintenance costs of the system are lower than those of existing systems. Second, the cartridge system is safer and simpler to operate. As a result, the technical training required for the operator is less extensive and system downtime is reduced. Finally, the cartridge system eliminates the numerous pieces of auxiliary equipment required for existing systems and thus occupies substantially less physical space. Many variations will be apparent to those skilled in the art. It is therefore to be understood that, within the scope of the appended claims, the invention may be practiced other than as specifically described.

What is claimed as new and desired to be secured by Letters Patent of the United States is:

1. An excimer laser system comprising:

a laser cartridge, a mixture of a noble gas and a halogen within said laser cartridge, a plurality of electrodes within said laser cartridge having an external electrical connection, an assemble for transmitting a laser beam output located at both ends of said laser cartridge;

said assembly for transmitting a laser beam output comprising reflective window and a transmissive window, said windows being made of a material selected from the group consisting of magnesium fluoride and calcium fluoride;

a laser base; and a compartment within said laser base for receiving said laser cartridge, said receiving compartment having a plurality of electrical connections for completing an electrical circuit with said external electrical connections of said laser cartridge when said laser cartridge is positioned within said receiving compartment.

2. An excimer laser system as recited in claim 1, wherein said laser cartridge has an internal mirror system for amplifying said laser beam output.

3. An excimer laser system as recited in claim 1, wherein said laser base has a mirror system external to said laser cartridge for amplifying said laser beam output.

4. An excimer laser system as recited in claim 1, further including a receptacle located within said receiving compartment and having a plurality of electrical connections for completing an electrical circuit with said external electrical connections of said laser cartridge.

5. An excimer laser system comprising:

a laser cartridge, a mixture of a noble gas and a halogen within said laser cartridge, a plurality of electrodes within said laser cartridge having an external electrical connection, an assembly for transmitting a laser beam output located at both ends of said laser cartridge;

a laser base;

a receiving compartment within said laser base for receiving said laser cartridge, said receiving compartment having a plurality of electrical connections for completing an electrical circuit with said external electrical connections of said laser cartridge when said laser cartridge is positioned within said receiving compartment;

receptacle located within said receiving compartment and having a plurality of electrical connections for completing and electrical circuit with said external electrical connections of said laser cartridge;

a dielectric plate;

a plurality of electrical connectors on said dielectric plate;

a spring clip attached to each of said electrical connectors;

a plurality of machined depressions within bases on said dielectric plate; and a plurality of openings within said dielectric plate for receiving an electrical feed.

6. An excimer laser system as recited in claim 5, wherein said receptacle within said receiving compartment connects to an interlock system for verifying that said laser cartridge, when positioned upon said receptacle, enables a power supply to charge.

7. A gas-containing cartridge for use in excimer laser systems, comprising:

(a) a container made primarily of aluminum covered with a halogen resistant coating;

(b) a mixture of a halogen and a noble gas within said container;

(c) a plurality of electrodes within said container, each having an external electrical connection;

(d) an assembly for transmitting a laser beam output located at each end of said container; and (e) a gas port on an exterior portion of said container.

8. A gas-containing cartridge for use in excimer laser systems as recited in claim 7, which further includes a mini-tank containing a supply of a mixture of a halogen and a noble gas for replenishing said mixture within said container.

9. A gas-containing cartridge for use in excimer laser systems as recited in claim 7, wherein said container has a plurality of internal mirrors for amplifying said laser beam output, each mirror located off-center at an end of said container within an annular mount.

10. A gas-containing cartridge for use in excimer laser systems as recited in claim 7, wherein said assembly for transmitting a laser beam output comprises a reflective window and a transmissive window, each window being made of a material selected from the group consisting of magnesium fluoride and calcium fluoride, and located off-center at an end of said container within a retainer.

11. A gas-containing cartridge for use in excimer laser systems as recited in claim 7, wherein said electrodes comprise a plurality of preionizing electrodes and a plurality of main discharge electrodes, said electrodes located on a side of said container.

12. A gas-containing cartridge for use in excimer laser systems as recited in claim 11, wherein said preionizing electrodes comprise two plates extending from a non-conductive base, said base connected by a non-conductive supporting member to an inner wall of said container.

13. A gas-containing cartridge for use in excimer laser systems as recited in claim 11, wherein said external electrical connection for said preionizing electrode is a device selected from the group consisting of a conductive retainer located at an end of said container and an external annular electrode located on said container.

14. A gas-containing cartridge for use in excimer laser systems as recited in claim 13, wherein an electrical feed connects said preionizing electrode to said external electrical connection.

15. A gas-containing cartridge for use in excimer laser systems as recited in claim 11, wherein said main discharge electrodes comprise two parallel bars, each connected by two conductive supporting members to an inner wall of said container.

16. A gas-containing cartridge for use in excimer laser systems as recited in claim 11, wherein said external electrical connection for said main discharge electrode is a device selected from the group consisting of a U-shaped band carrying a ball bearing and a U-shaped band carrying two ball bearings.

* * * * *